United States Patent [19]

Piatkowski, Jr.

[11] 4,010,650
[45] Mar. 8, 1977

[54] APPARATUS FOR GENERATING AN ELECTRICAL SIGNAL INDICATIVE OF LIQUID LEVEL

[75] Inventor: Philip Piatkowski, Jr., Fraser, Mich.

[73] Assignee: Ford Motor Company, Dearborn, Mich.

[22] Filed: Dec. 26, 1974

[21] Appl. No.: 536,663

[52] U.S. Cl. ............................................. 73/304 C
[51] Int. Cl.² ....................................... G01F 23/26
[58] Field of Search ..................... 73/304 C, 304 R

[56] References Cited
UNITED STATES PATENTS

| | | | |
|---|---|---|---|
| 2,375,084 | 5/1945 | Coroniti et al. | 73/304 C |
| 2,500,348 | 3/1950 | DeGiers et al. | 73/304 C UX |
| 2,908,166 | 10/1959 | Johnson | 73/304 C |
| 2,950,426 | 8/1960 | Frome | 73/304 C X |
| 3,079,797 | 3/1963 | Hermanson | 73/304 C |
| 3,475,960 | 11/1969 | Miller | 73/304 C |
| 3,678,749 | 7/1972 | Harper | 73/304 R |
| R23,493 | 5/1952 | Edelman | 73/304 C |

Primary Examiner—Richard C. Queisser
Assistant Examiner—Daniel M. Yasich
Attorney, Agent, or Firm—Keith L. Zerschling; Robert W. Brown

[57] ABSTRACT

Apparatus for generating an electrical signal indicative of the level of a liquid stored in a reservoir. The apparatus includes first and second probes spaced from one another and extending into the reservoir. Each of the probes includes a metal electrode surrounded by a preferably dielectric material. The liquid to be measured contacts the dielectric material, but does not directly contact the electrodes. A preferably alternating voltage is applied across the electrodes and the impedance therebetween is sensed. The impedance between the electrodes varies as a function of the level of the liquid in the reservoir and this impedance is substantially greater than the impedance between the probe areas of contact with the liquid. In effect, the liquid is treated as a conductor because its impedance is negligible as compared to the impedance between the probe electrodes, this impedance varying as a function of liquid level.

2 Claims, 4 Drawing Figures

APPARATUS FOR GENERATING AN ELECTRICAL SIGNAL INDICATIVE OF LIQUID LEVEL

BACKGROUND

This invention relates to apparatus for generating an electrical signal indicative of the level of a liquid stored in a reservoir.

Although many devices have been developed for indicating liquid level, accurate and reliable, but inexpensive, devices for providing a remote indication of potable or waste water level are not generally available. A device for this purpose should not be subject to malfunction resulting from contaminated and impure water. Also, it should be insensitive to electrical noise, should have a substantially linear indication of liquid level, should permit remote indication thereof and should be easily installed in the liquid reservoir. For use in conjunction with a mobile reservoir, for example, to provide a liquid level indication for the water or waste stored in a tank of a recreational vehicle, the electrical liquid level indicating apparatus should be able to operate using a conventional DC voltage supply, such as a vehicle twelve-volt storage battery.

Electrical liquid level indicating devices of the prior art have generally been unsuitable for the indication of potable or waste water level due to their sensitivity to impurities in the water or because the conductivity of the water varies too greatly or renders use of the electrical liquid-level indicating apparatus impractical. Also, electrical liquid-level indicating apparatus which requires direct electrical contact of metal probes or the like with water may prove unsatisfactory due to the electolytic effect of the water on the metal probe. This electrolytic effect corrodes metal parts and, with respect to potable water, contamination may result.

SUMMARY OF THE INVENTION

The present invention provides apparatus for generating an electrical signal indicative of the level of a liquid stored in a reservoir. The apparatus is particularly suitable for use in indicating the level of potable or waste water in the reservoir of a recreational vehicle or the like, but it is also satisfactory for indicating the levels of other liquids and may be used in stationary locations.

An important feature of the invention is that the liquid whose level is to be indicated is treated as an electrical conductor. Two probes are utilized, each of these probes including a metal electrode and a preferably dielectric material covering the electrode in the area of the probe to be contacted by the liquid whose level is to be indicated. The impedance between the electrodes varies in proportion to the level of the liquid in the reservoir. In the preferred form of the invention, the metal electrodes are elongated and are spaced apart. An alternating voltage is applied across the electrodes. Circuit means are provided for measuring the variation in impedance between the electrodes, this impedance being proportional to the liquid level. The probes form two series-connected capacitors; the metal electrodes each form a "plate" for one of the capacitors and the liquid in the reservoir forms a common plate for the two capacitors. The frequency of the alternating voltage is chosen so that the reactive component of the impedance between the electrodes is substantially greater than the resistive component. Also, the impedance between the area of contact of the liquid with one of the probes and the area of contact of the liquid with the other of the probes is substantially less than the impedance between the electrodes with the alternating voltage applied.

The invention may be better understood by reference to the detailed description which follows and to the drawings.

DETAILED DESCRIPTION

Figure 1:
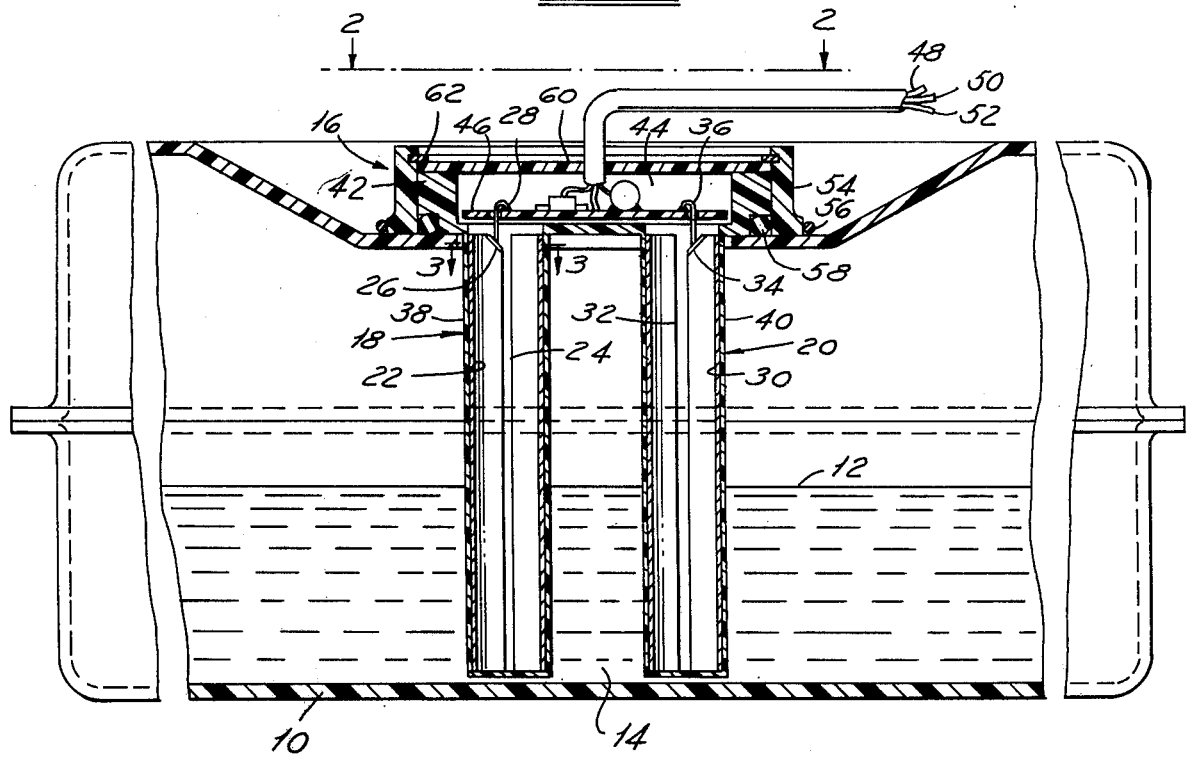
FIG. 1 is a sectional elevational view of a reservoir and apparatus for generating an electrical signal indicative of the level of a liquid stored in the reservoir.

With reference now to the drawings, wherein like numerals refer to like parts in the several views and wherein component values or type numbers are provided for purposes of illustration and not limitation, there is shown in FIG. 1 a reservoir 10 made from a plastic material and partially filled to a level 12 by a liquid 14. For purposes of this description of the presently preferred embodiment illustrated in FIG. 1, it will be assumed that the liquid 14 is potable water.

Figure 3:
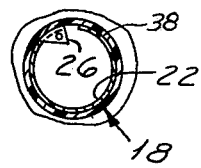
FIG. 3 is a sectional view of a probe illustrated in FIG. 1, the section being taken along the line 3—3 in FIG. 1.

A probe and electronic circuit assembly, generally designated by the numeral 16, is mounted on the reservoir 10. The assembly 16 includes probes 18 and 20 spaced from one another in the reservoir and extending vertically therein from the top to the bottom of the reservoir. The probes are identical. FIG. 3 is a sectional view of the probe 18. It may be seen that the probe 18 includes a metal electrode 22, preferably cold rolled steel, of cylindrical configuration and having an axial separation 24 permitting it to be compressed to slightly reduce its diameter. The upper corner adjacent the separation 24 in the electrode 22 is bent radially inwardly to form a tab 16 to facilitate the connection of an electrical lead wire 28 to the electrode 22. Similarly, the probe 20 includes a metal electrode 30 having an axial separation 32 and a bent corner tab 34 to permit connection thereto of an electrical lead 36.

Electrode 22 of probe 18 is completely surrounded or covered with a nonmetallic or dielectric material 38, and the electrode 30 of probe 20 similarly is covered with a nonmetallic or dielectric material 40. The nonmetallic or dielectric materials have an electrical conductivity substantially less than that of the liquid 14. Preferably, the material is high density polyethylene, a dielectric material. As shown in FIG. 1, the dielectric material electrode coverings 38 and 40 are molded as an integral electrode housing 42 into which the electrodes 22 and 30 are inserted to form the probes 18 and 20. The electrode insertion is facilitated by the separations 24 and 32 which permit their diameter reduction and expansion after insertion in the respective coverings 38 and 40.

The housing 42 has a chamber 44 of circular cross section in which a printed circuit board 46 is located. Lead wires 28 and 36 from the electrodes 22 and 30 are connected to the circuit board 46. Three insulated lead wires 48, 50 and 52 also are connected to the printed circuit board 46. Lead wires 48 and 50 are connected to opposite terminals of a DC source of electrical energy to supply such energy to the circuit board 46. Lead wire 52 carries an output electrical signal, generated by the circuit board 46 and indicative of the level 12 of the liquid 14 in the reservoir 10, to an external indicating device such as an electrical gage.

The electrode housing 42 is positioned within a flange adaptor 54 that is welded at 56 to the reservoir 10. Typically, a reservoir for potable water is made from polyethylene plastic because this material does not contaminate potable water. For this reason, it is preferred that the flange adapter 54 and the weld 56 be formed from polyethylene materials. An O-ring 58 forms a seal between the flange adapter 54 and the electrode housing 42. A plastic cover 60 encloses the chamber 44, and the electrode housing 42 and cover 60 are maintained in position in the flange adapter 54 with a metal snap ring 62 which fits in a groove formed in the flange adapter 54.

It should be noted that the liquid 14 surrounds the probes 18 and 20 and contacts a portion of the surface area of the dielectric covering materials 38 and 40 thereof. The level 12 of the liquid 14 determines the amount of the dielectric material surface area that is in contact with the liquid. As the liquid level changes, this dielectric material surface area of each probe contacted by the liquid varies in like proportion. The capacitance between the probe electrodes 22 and 30 is directly proportional to this liquid contact area and hence increases in direct proportion to the level of the liquid 12.

Electrically, the circuit between the electrode 22 and the electrode 30 includes the dielectric covering material 38 connected in series with the liquid 14 and the covering material 40. If the liquid 14 were an electrical conductor, the electrode 22 would form one plate of a capacitor having the dielectric material 38 and having the liquid 14 as its other plate. The liquid plate 14 would be common to a second capacitor formed by the series-connected dielectric material 40 having electrode 30 as its opposite plate. However, since the liquid 14, which may comprise water, is not a perfect conductor, the equivalent circuit between the electrodes 22 and 30 consists of a capacitor connected in series with a resistance which in turn is connected in series with a second capacitor.

If the circuit between the electrodes 22 and 30 is supplied with an alternating voltage of suitable frequency, the impedance between electrodes 22 and 30 may be made to have a reactive component which is substantially in excess of the resistance component contributed primarily by the liquid 14 between the dielectric materials 38 and 40. If this reactive component is substantially greater, than the resistance, then the resistance contribution is negligible and the variation in impedance between the electrodes 22 and 30 as the liquid level 12 varies as a function of the reactive component and may be sensed to provide an indication of liquid level.

Figure 2:
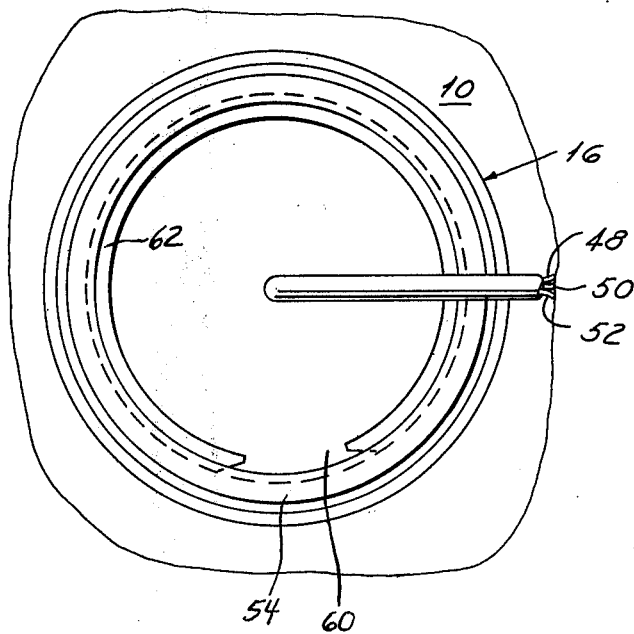
FIG. 2 is a partial plan view of the signal generating apparatus shown in FIG. 1, the view of FIG. 2 being taken in the direction of the arrows 2—2 in FIG. 1.

For the structure illustrated in FIGS. 1 through 3 for use in measuring water level, it has been found suitable to supply across the electrodes 22 and 30 an alternating voltage having a frequency of about 200 Hz. Of course, the larger the capacitive reactive component of the impedance between the electrodes, the less is the effect of variations in resistivity of the liquid 14. With the electrical circuit shown in FIG. 4 and the structure of FIG. 1, a change from impure water to third distillate water may produce as little as 2% change in liquid level output indication.

With a constant alternating voltage applied across electrodes 22 and 30, the impedance between these electrodes is inversely proportional to the amount of probe surface area in contact with the liquid 14. The current flow between the electrodes 22 and 30 is inversely proportional to this impedance and directly proportional to the amount of surface area of the probes 18 and 20 contacted by the liquid 14. This surface area increases in direct proportion to the liquid level 12 and, hence, the current flow between the electrodes is a linear function of the liquid level 12. Preferably, the capacitive reactive component of the impedance between the electrodes is at least about 5 times greater than the resistive component of this impedance.

Figure 4:
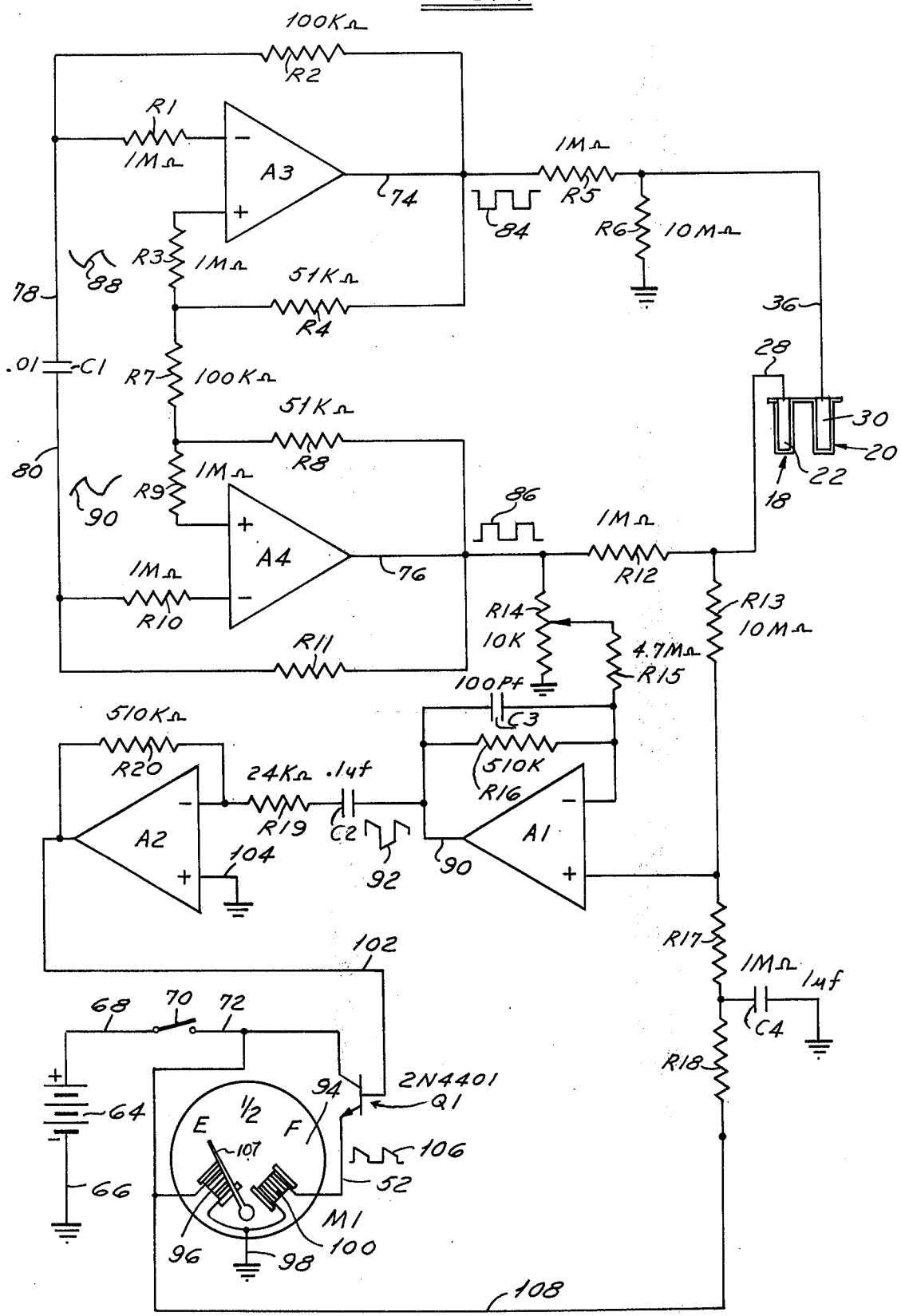
FIG. 4 is a schematic electrical diagram of the apparatus of FIG. 1 for generating an electrical signal indicative of the level of a liquid stored in a reservoir.

With particular reference now to FIG. 4, there is shown an electrical circuit including circuit means for applying an alternating voltage across the probes 18 and 20. The circuit of FIG. 4 also includes circuit means for generating an electrical signal proportional to current flow between the electrodes 22 and 30, respectively, of probes 18 and 20. Of course, as previously mentioned, this current flow is inversely proportional to the impedance between the electrodes.

The circuit of FIG. 4 includes a DC source of electrical energy 64, which may be a conventional twelve-volt storage battery, having its negative terminal connected by a lead 66 to ground potential and having its positive terminal connected by a lead 68 to a switch 70. Preferably, switch 70 when closed supplies positive potential to a lead 72 and also provides the supply voltage for operational amplifiers A1, A2, A3 and A4 utilized in the circuit of FIG. 4. Preferably, the operational amplifiers A1, A2, A3 and A4 each constitute one quarter of a quad "current mirror" operational amplifier commercially available. A very inexpensive Motorola type MC3301 quad operational amplifier may be used.

Operational amplifiers A3 and A4, together with the associated circuitry, comprises circuit means for applying an alternating voltage, having a frequency of about 200 Hz, across the electrodes 22 and 30 of the probes 18 and 20. Operational amplifier A3 has an input resistor R1 connected to its negative input terminal and has a feedback resistor R2 connected between its output lead 74 and the terminal of resistor R1 remote from the amplifier A3. Similarly, operational amplifier A4 has an input resistor R10 connected to its negative input terminal and has a feedback resistor R11 connected between its output lead 76 and the terminal of resistor R10 remote from amplifier A4. A capacitor C1 has its lead 78 connected to the junction formed between resistors R1 and R2 and has its lead 880 connected to the junction formed between the resistors R10 and R11. Resistors R4, R7 and R8 are connected in series between the respective output terminals 74 and 76 of operational amplifiers A3 and A4. An input resistor R3 has one of its terminal connected to the junction formed between resistors R4 and R7 and has its other terminal connected to the positive input of amplifier A3. Similarly, a resistor R9 has one of its terminals connected to the junction formed between resistors R7 and R8 and has its opposite terminal connected to the positive input of operational amplifier A4.

The circuit described above forms a capacitor-controlled oscillator which produces a square-wave voltage 82 on output lead 74 of amplifier A3 and a square-wave voltage 86 on the output lead 76 of amplifier A4. The output wave-forms 84 are 180° out of phase so that when the voltage on amplifier A3 output lead 74 is high, the voltage on output lead 76 of amplifier A4 is low and vice versa. With the circuit shown and a twelve-volt DC source 64, the output voltage waveforms 84 and 86 may vary from about 10 volts as a high voltage level to ground or zero volts as a low voltage level.

The frequency of the output wave-forms 84 and 86 is controlled by capacitor C1 and resistors R2 and R11. The voltage waveform on capacitor lead 78 is shown at 88 and that on lead 80 is shown at 90.

Resistors R3 and R9 are input resistors for the respective positive inputs of amplifiers A3 and A4. Resistors R4, R7 and R8 constitute a voltage divider for the voltages between the outputs of amplifiers A3 and A4. Thus, if the output of the amplifier A3 is 10 volts and that of amplifier A4 is zero volts, this voltage is divided by resistors R4, R7 and R8 such that the voltage at the junction between resistors R4 and R7 is about 7.5 volts and the voltage at the junction between resistors R7 and R8 is about 2.5 volts. When the voltage on lead 78 of the capacitor C1, which voltage is applied through input resistor R1 to the negative input of amplifier A3, obtains the 7.5 volt level applied through input resistor R3 to the positive terminal of amplifier A3, the output of the amplifier A3 changes from 10 volts to zero volts. This voltage on capacitor lead 78 occurs due to the charging of capacitor C1 through resistor R2 from the current flow due to the 10-volt high voltage level signal on output lead 74 of amplifier A3. When the amplifier A3 switches from a high level voltage on its output lead 76 to ground potential thereon, lead 76 suddenly is placed at ground potential and capacitor lead 80, which is more negative than lead 78 by the voltage to which it has been charged, is well below ground potential so that the amplifier A4 switches from its ground potential output to a 10-volt output potential on its output lead 76. Thus, amplifiers A3 and A4 switch at the same time. With the output lead 76 of amplifier A4 at 10 volts, the junction between resistors R7 and R8 is about 7.5 volts and the junction between resistors R4 and R7 is about 2.5 volts. The capacitor C1 then charges in the reverse direction through resistor R11 due to the 10-volt signal on amplifier A4 output lead 76. The process described repeats itself to produce the oscillating square waveforms 84 and 86 which are 180° out of phase with one another.

The output of the amplifier A3 is applied through a resistor R5 to the lead 36 connected to probe electrode 30. A resistor R6 is connected between the lead 36 and ground potential. The output of the amplifier A4 is connected through a resistor R12 to the lead 28 connected to probe electrode 22. A potentiometer R14 is connected between output lead 76 of amplifier A4 and ground potential. A resistor R13 has one of its terminals connected to the lead 28 and has its other terminal connected to the positive input of amplifier A1. The arm of the potentiometer R14 is connected through a resistor R15 to the negative input of the amplifier A1. Amplifier A1 has a feedback resistor R16 connected between its negative input and its output lead 90. A capacitor C3 is connected in parallel with feedback resistor R16.

Amplifiers A1 and A2, the resistors R12, R13 and R14 and the other circuit elements associated with these amplifiers comprise circuit means for generating an electrical signal indicative of the liquid level in the reservoir 10. Resistors R5 and R6 balance the loading effect produced by resistors R12, R13 and R14 on the electrical circuit between leads 28 and 36.

The current through the resistor R12 is proportional to the current flowing between the electrodes 22 and 30 of the probes 18 and 20. This current through R12, therefore, is directly proportional to the liquid level. Amplifier A1 produces an alternating output voltage 92 which is proportional in magnitude to the current flowing through the resistor R12. The signal applied across the positive and negative inputs of the amplifier A1 is proportional to the voltage difference across the resistor R12, which voltage difference is proportional to the current flow therethrough. The capacitor C3 connected between the negative input and the output 90 of amplifier A1 provides high-frequency-noise filtering. The output lead 90 of the amplifier A1 is connected through the series combination of a capacitor C2 and a resistor R19 to the negative input of the amplifier A2. The capacitor C2 provides low-frequency-noise filtering for the output signal on the output lead 90 of amplifier A1.

Amplifier A2 and a transistor Q1 form an absolute value amplifier circuit to convert the peak alternating voltage signal at the input of the amplifier A2 to a DC voltage to allow operation of a DC liquid level indicating gauge 94.

The indicating gauge 94 has an electrical coil 96 through which a current from lead 72 continuously flow to ground at 98. A second electrical coil 100 in the gauge has one of its leads connected to ground and has its other lead 52 connected to the emitter of the transistor Q1 whose collector is connected to the lead 72. The output lead 102 of the amplifier A2 is connected to the base of the transistor Q1. Amplifier A2 has its positive input terminal 104 connected to ground and has a feedback resistor R20 connected between its negative input and its output lead 102. As a result of these circuit connections, the voltage waveform 106 occurs at the emitter of the transistor Q1. This voltage waveform produces a current through the gauge electrical coil 100 which is proportional to liquid level in the reservoir 10. The position of the indicator 107 gauge 94 is determind by the vector resultant of the magnetic fluxes produced in the respective electrical coils 96 and 100. The electrical indicating gauge 94 often is referred to as ratiometer and its operation is independent of voltage variations of the DC source 64.

The preferred embodiment described in detail herein utilizes a dielectric material covering the electrodes 22 and 30 of the probes positioned in the reservoir 10. Other coating materials may be used provided the impedance between the electrodes 22 and 30 is substantially greater, with the selected alternating or other voltage applied across these electrodes, than the impedance between the respective areas of contact of the probes 18 and 20 with the liquid. Of course, the impedance between the electrodes must vary as a function of liquid level.

In the circuit of FIG. 4, resistors R17 and R18 are connected between the positive input of the amplifier A1 and a positive voltage supply lead 108. Also, a capacitor C4 is connected between the junction of the resistors R17 and R18 and ground potential. The resistors are required for normal operation of the operational amplifiers utilized in this preferred embodiment.

The capacitor C4 is provided as a filter to keep supply voltage noise from reaching the input of the amplifier A1.

Based upon the foregoing description of the invention, what is claimed is:

1. Apparatus for generating an electrical signal indicative of the level of a liquid stored in a reservoir, said apparatus comprising:

first and second probes spaced from one another and extending into said reservoir, said liquid stored in said reservoir contacting said probes, the area of contact between said probes and said liquid varying in proportion to the level of said liquid in said reservoir, each of said probes comprising a metal electrode and a dielectric material covering said electrode over said area of contact between said probe and said liquid, said dielectric material having an electrical conductivity substantially less than that of said liquid, said probes, when in contact with said liquid, forming two series-connected capacitors having said liquid as a common plate of said two capacitors;

circuit means for applying a constant amplitude alternating voltage across said electrodes, said alternating voltage having a frequency which produces an impedance of said series-connected capacitors having a reactive component at least about five times greater that the resistive component thereof; and circuit means for generating an electrical signal proportional to the impedance between said electrodes, said electrical signal being indicative of the level of said liquid stored in said reservoir.

2. Apparatus for generating an electrical signal indicative of the level of a liquid stored in a reservoir, said apparatus comprising:

first and second probes spaced from one another and extending into said reservoir, said liquid stored in said reservoir contacting said probes, the area of contact between said probes and said liquid varying in proportion to the level of said liquid in said reservoir, each of said probes comprising a metal electrode and a dielectric material covering said electrode over said area of contact between said probe and said liquid, said dielectric material having an electrical conductivity substantially less than that of said liquid, said probes, when in contact with said liquid, forming two series-connected capacitors having said liquid as a common plate of said two capacitors;

circuit means for applying a constant amplitude alternating voltage across the electrodes; and circuit means for generating an electrical signal proportional to the impedance said electrodes, said circuit means comprising a resistor connected in series with said probes, the voltage generated across said resistor being proportional to current flow through said probes, and circuit means for measuring the voltage across said resistor, said voltage being an electrical signal indicative of the level of said liquid stored in said reservoir.

* * * * *